Aug. 11, 1953  K. A. COOL ET AL  2,648,591
ELECTRICALLY OPERATED RECORDER
Filed March 28, 1947  2 Sheets-Sheet 1

INVENTORS
KENNETH A. COOL,
JAMES M. HUSH,
BY WALTER ERNST AND
DAVID E. BENCH.

Oberlin & Limbach
ATTORNEYS

Aug. 11, 1953 K. A. COOL ET AL 2,648,591
ELECTRICALLY OPERATED RECORDER
Filed March 28, 1947 2 Sheets-Sheet 2

INVENTORS
KENNETH A. COOL,
JAMES M. HUSH,
WALTER ERNST AND
DAVID E. BENCH.
BY Oberlin + Limbach
ATTORNEYS.

Patented Aug. 11, 1953

2,648,591

UNITED STATES PATENT OFFICE 2,648,591

ELECTRICALLY OPERATED RECORDER

Kenneth A. Cool, Cleveland, James M. Hush, Dayton, Walter Ernst, Mount Gilead, and David E. Bench, Dayton, Ohio, assignors to The Service Recorder Company, Cleveland, Ohio, a corporation of Ohio Application March 28, 1947, Serial No. 737,944

3 Claims. (Cl. 346—123)

This invention relates as indicated to an electrically operated recorder and more particularly to a device adapted to record the periods of operation of electrically operated machines and the like.

Because of the large investments by industry in electrically operated machines it is becoming more and more appreciated that it is important for efficient analysis of operations to know how frequently and for how long such machines are in actual operation. Thus it may be found desirable to revise production schedules and the like in order to secure substantially continuous operation of such machines in order to obtain a satisfactory return on the investment therein. It is apparent that such a recording device may be advantageously employed on a wide range of machines, as, for example, arc welders, refrigerators, elevators, etc.

It is therefore a primary object of this invention to provide a recorder which is adapted to indicate the frequency and length of operation of an electrically operated machine or the like.

Another object is to provide such a device which will provide a quickly legible record permitting a clerk at once to determine when and for what periods the machine was used.

A further object is to provide such a device which is adaptable to a wide range of different machines.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
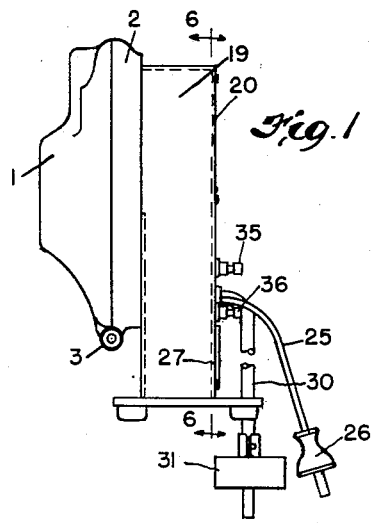
Fig. 1 is a side elevational view of the recorder of this invention.
Figure 2:
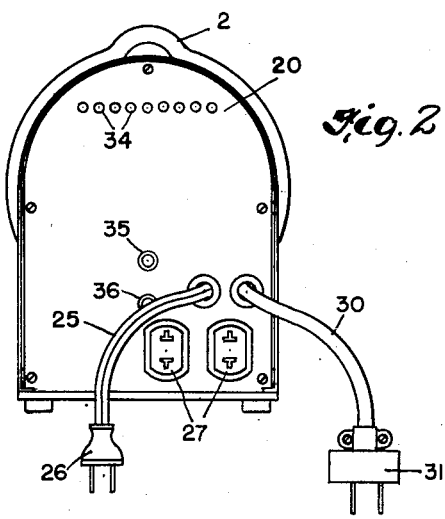
Fig. 2 is a rear elevational view of such recorder.
Figure 3:
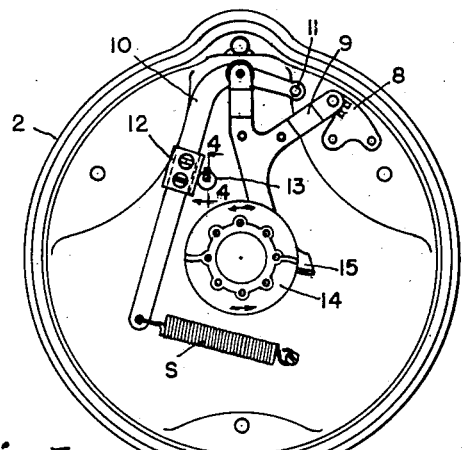
Fig. 3 is a view showing the front of the housing opened to disclose the record disk or time sheet and the stylus operating mechanism.

Referring now more particularly to such drawings and especially Figs. 1–3, the recorder of this invention comprises a die-cast housing for the recording sheet and stylus, such housing consisting of front and back members 1 and 2 respectively, hingedly connected at 3. Such front member contains clockwork C adapted to drive a supporting plate 4 carrying a paper time disk 5 in the manner described in Cool Patent No. 1,980,786, such time disk being held in proper position thereon by means of clamping fingers 6 and 7. The back portion 2 of such housing carries a boss 8 to which is pivotally attached one arm of a bifurcated member 9; in the other arm there is pivotally mounted, preferably in needle bearings, an L-shaped lever arm 10 carrying a stylus 11. Such L-shaped arm is provided with a wear plate 12, approximately midway of its length, adapted to be held in close engagement with eccentric 13 by means of tension spring "S" extending between the end of such arm and a boss on such housing.

As described in the aforesaid Patent No. 1,980,786 means may also be provided on such housing member for swinging such mounting for the stylus bearing arm 10, such means comprising an actuator 14 adapted to be driven by engagement with clamping fingers 6 and 7 to move outwardly by the rack 15 on the end of member 9. In this manner a spiral record will be obtained on the time sheet permitting the same time sheet to be employed for a longer period of time than would be obtained by a single revolution.

Figure 4:
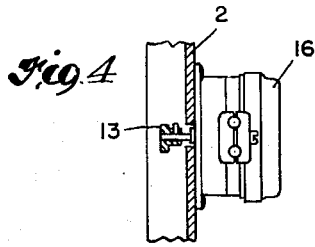
Fig. 4 is a fragmentary sectional view taken along the line 4—4 on Fig. 3 showing the electric motor and cam means driven thereby operative to reciprocate such stylus.

Mounted on the back of housing member 2 is an electric motor 16 of the type generally employed to operate electric clocks, time clocks, and the like, and commercially available with appropriate reduction gearing (not shown) included in the unit. As shown in Fig. 4 such motor is adapted to drive eccentric 13 whereby to rock lever arm 10 and reciprocate stylus 11. The exact speed of rotation of such eccentric is not of importance, the usual reduction gearing regularly available with motors of this type being entirely satisfactory as above indicated. It is, however, desired that such eccentric revolve sufficiently rapidly relative to the revolution of time sheet 5 so that stylus 11 will produce a solid mark of substantial width, as indicated at 17 on Fig. 5 rather than merely a zigzag line. The recording sheets employed will preferably be of a dark color covered with a thin layer of wax which is adapted to be scraped away by the stylus to leave a narrow line 18 when the eccentric is not turning and a broad solid line 17 when such eccentric is being driven by motor 16.

Figure 6:
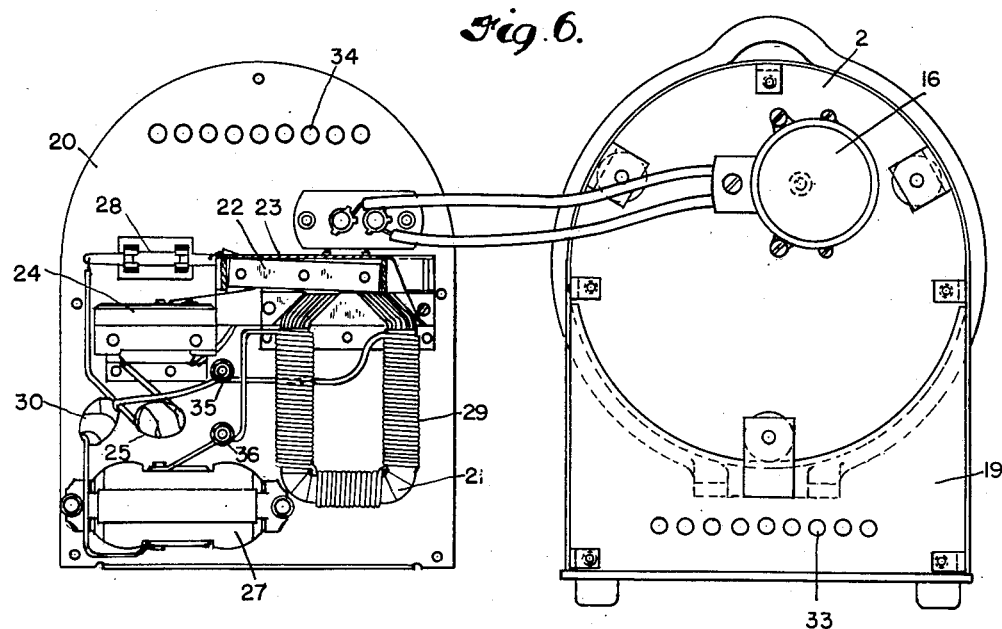
Fig. 6 is an elevational view of the device similar to Fig. 2 but showing the back panel detached and turned around to disclose the electrically operated control means secured thereto.

The control mechanism for such motor is contained in a rear housing 19 having a back panel 20. As best shown in Fig. 6, such back panel carries the various elements comprising the control means for electric motor 16. A substantially U-shaped electro-magnet 21 having a laminated core is adapted when energized to attract clapper 22 "floating" in a cage 23. Such clapper thus attracted is adapted to operate micro-switch 24 which has been loaded to render the same particularly sensitive. The closing of such switch closes the motor circuit connecting such motor to two-wire lead 25 terminating in plug 26.

When the machine being checked operates on the same current as that required to operate motor 16, in this case 110 volts A. C., plug 26 may be plugged into one socket of duplex receptacle 27. A fuse 28 is provided in the motor circuit.

Figure 7:
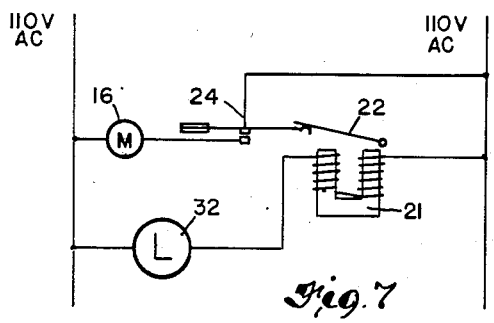
Fig. 7 is a wiring diagram of such control means where the machine being checked is operated from the same current source as that employed to operate the motor of the recorder.
Figure 8:
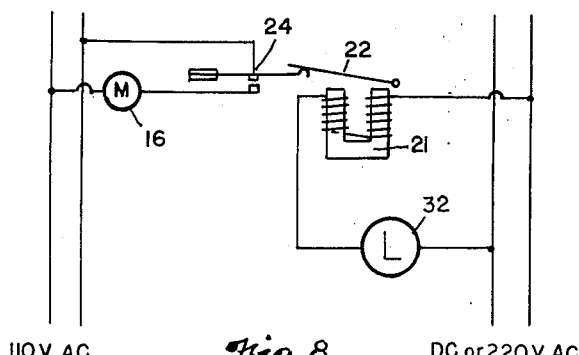
Fig. 8 is a typical wiring diagram where the machine being checked requires a different current source than that required to operate such motor.

The leads from the coils 29 around magnet 21 pass to receptacle 27 and two-wire lead 30, respectively. The wire from the other side of such receptacle forms the other wire of such two-wire lead 30, terminating in plug 31. The load 32 to be checked is plugged into such receptacle and plug 31 is plugged into the appropriate power source. As above indicated, if such power source is the same as that required by motor 16 then plug 26 may likewise be plugged into the other outlet of receptacle 27. Fig. 7 shows such an arrangement in simplified form. If the load 32 requires 220 A. C., for example, while the motor 16 requires 110 A. C., then plug 26 must be plugged into a separate 110 A. C. line instead of receptacle 27, and plug 31 must be plugged into a 220 A. C. line (see Fig. 8). The windings of coil 29 must, of course, be of sufficiently heavy wire to carry the current without overheating. Openings 33 are provided in the lower portion of the front of housing 19 and openings 34 in the upper portion of panel 20, to afford ventilation.

Figure 9:
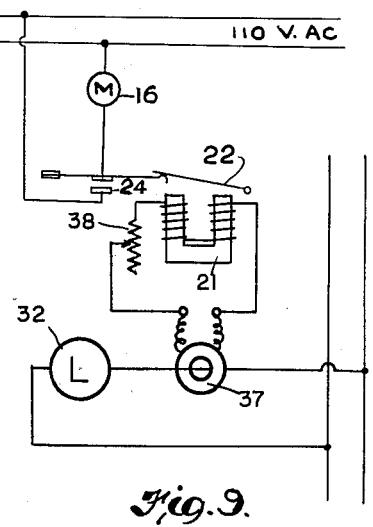
Fig. 9 shows a wiring modification in which such control means is adapted to be energized by means of an induced current.

Various modifications of the above-described wiring are possible as required by circumstances. Any load, if desired, may be monitored by connecting it to binding posts 35 and 36, within the limits permitted. Ordinarily, if the load exceeds 15 amperes other means of energizing magnet 21 should be found. As shown in Fig. 9, one solution of the problem is to employ a transformer 37, the primary leading to the load and the secondary to the magnet coil 29. By varying the relative number of turns of primary and secondary such transformer may be adapted to a wide range of loads. A variable resistance 38 may be inserted in the transformer circuit to render magnet 21 ineffective to operate micro-switch 24 when the load 32 is drawing normal current but only sufficiently energized to thus operate such switch when a higher current is drawn. Thus the recorder may be caused to remain inactive when an electric arc welding machine is turned on but responsive to the increased current flow during actual welding to record such periods of use.

Similarly when it is desired to record periods of very slight current flow below the limit of sensitivity of the solenoid controlled microswitch, a current may be imposed on the solenoid circuit just insufficient to operate such switch so that the slight additional current of the device being monitored will be adequate to operate the relay.

When employing a transformer in the manner above explained it has been found advantageous to use a magnet of a type designed to become saturated under the influence of a relatively low exciting current. It thus becomes possible to use the same transformer for a wide range of loads since, under increased loads, the impedance afforded by such magnet operates to prevent an undue rise in the current in the secondary. For example, the secondary current instead of rising to 5 amps. under a 50 amp. primary load (corresponding to the rating of the transformer) may be kept down to 1.9 amps. and under a 100 amp. primary load will reach only 2.5 amps. Since it is entirely practical to provide a magnet having a range up to 15 amps. it is apparent that a single transformer will be all that is required for any load likely to be encountered. As the primary current increases, the mutual inductance of the secondary with respect to the primary decreases with saturation of the transformer core, thereby still further tending to decrease the amount of the resulting increase in secondary current.

The magnet 21 employed is of a modified horseshoe type having a core of laminated silicon steel. It magnetizes under relatively light current, has a low hysteresis loss, and is characterized by low residual magnetism. Bringing the ends of the magnet toward each other, as shown in Fig. 6, has the advantage of shortening the magnetic path through clapper 22 with a consequent lowering of the reluctance of such path. One pole face, preferably that farthest from the pivot point of the clapper, will be recessed slightly (e. g. .003 in.) to reduce magnetic coupling of the clapper and ensure release of such clapper by the magnet when current ceases to flow. It will be seen, therefore, that a relay has been provided which, while sensitively operable in response to low current, will nevertheless also operate at higher currents (e. g. 15 amps.) without creating an undue voltage drop in the load circuit or causing "sticking" of the clapper due to residual magnetism.

Figure 5:
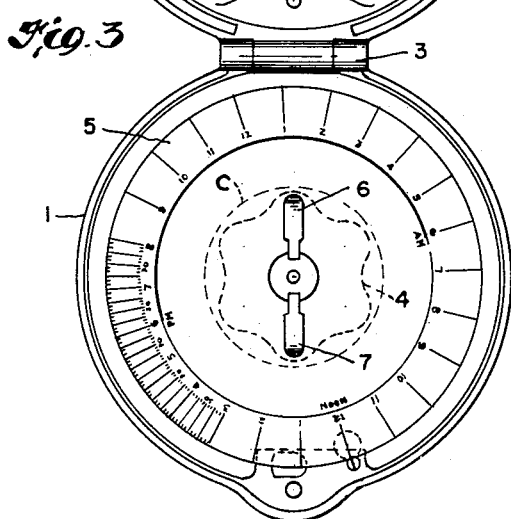
Fig. 5 is an enlarged fragmentary view of a portion of such time sheet showing a typical time record inscribed thereon.
Figure 5:
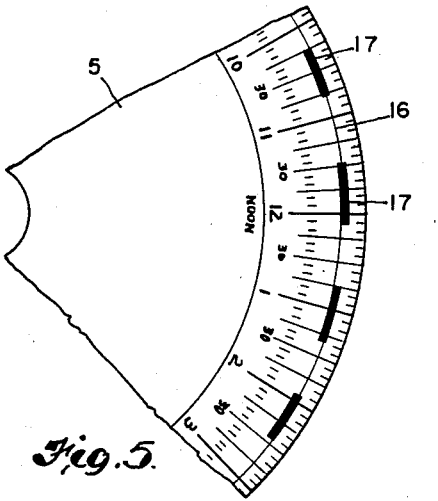

It will be seen from the foregoing that a recorder has been provided adapted to monitor electrically operated machines and devices in an exceedingly precise and accurate manner, and at the same time provide a visible record of a type which may be deciphered at a glance. Known types of recorders for this purpose move a stylus from one fixed position to another when the operating current is turned on or off, thereby obtaining a narrow line record which must be studied carefully if it is to be correctly interpreted. As shown in Fig. 5, the record obtained by use of the device of this invention is quickly legible and eliminates all possibility of error.

Other modes of applying the principle of the invention may be employed, change being made as regards the details described, provided the features stated in any of the following claims or the equivalent of such be employed.

We therefore particularly point out and distinctly claim as our invention:

1. In a device for recording periods of electric current flow in a load circuit, which device comprises a housing, clockwork for uniformly rotating a recording disc and a stylus adapted to bear against such disc; a rotary electric motor in such housing, an eccentric driven by said motor operative to reciprocate such stylus substantially radially of such disc, a transformer arranged and disposed to be responsive to the current flowing in such load circuit, and a relay connected in the secondary circuit of said transformer operative in actuated position continuously to energize said motor, whereby the motor will be thus energized during the periods of load current flow producing relay actuation.

2. In a device for recording periods of electric current flow comprising a housing, clockwork operative continuously to rotate a recording sheet, a stylus adapted to bear against such sheet, and means operative to move such stylus; a rotary electric motor in such housing, an eccentric driven by said motor operative continuously to reciprocate such stylus substantially radially of such sheet to form a wide solid line, an energization circuit for said motor adapted to be connected to a standard source of supply, a normally open switch in said energization circuit, and a separately energizable control circuit including relay means responsive to current flow in the circuit being checked adapted to actuate said switch, such relay means being operative to close said switch to start said motor at the beginning of each period of such current flow and to maintain the same closed until the end of such period, whereupon said switch will open to stop said motor, each period of such current flow thereby being accompanied by a coextensive period of continuous motor energization.

3. A device for recording periods of electric current flow comprising a housing, time-controlled means operative to move a recording sheet, a stylus adapted to bear against such sheet, a support for said stylus, a rotary electric motor adapted to operate continuously during such periods of current flow, an eccentric driven by said motor operative through mechanical engagement with said stylus support to reciprocate said stylus transversely to the direction of movement of such sheet, and rapidly relative to such movement of such sheet to form a wide solid line, and relay means responsive to current flow in the circuit being checked operative to start and stop said motor respectively at the beginning and end of each such period of current flow.

KENNETH A. COOL.
JAMES M. HUSH.
WALTER ERNST.
DAVID E. BENCH.

References Cited in the file of this patent

UNITED STATES PATENTS

| Number | Name | Date |
|---|---|---|
| 571,110 | Dillon | Nov. 10, 1896 |
| 986,457 | Green et al. | Mar. 14, 1911 |
| 1,132,308 | Dempster | Mar. 16, 1914 |
| 1,205,353 | Jones | Nov. 21, 1916 |
| 1,282,693 | Hollingdrake | Oct. 22, 1918 |
| 1,320,097 | Sattler | Oct. 28, 1919 |
| 1,391,093 | Bickel | Sept. 20, 1921 |
| 1,757,625 | Greibach | May 6, 1930 |
| 1,822,075 | Aronoff | Sept. 8, 1931 |
| 1,850,078 | Johnson | Mar. 22, 1932 |
| 1,856,699 | Evans et al. | May 3, 1932 |
| 1,871,709 | Legg | Aug. 16, 1932 |
| 1,950,832 | Winter | Mar. 13, 1934 |
| 1,957,895 | Manthey | May 8, 1934 |
| 1,980,786 | Cool | Nov. 13, 1934 |
| 1,983,887 | Viall | Dec. 11, 1934 |
| 2,341,834 | Wallace | Feb. 15, 1944 |